(12) United States Patent
Ootsuki

(10) Patent No.: US 9,023,930 B2
(45) Date of Patent: *May 5, 2015

(54) METHOD FOR PRODUCING SLURRY COMPOSITION

(75) Inventor: Kenichi Ootsuki, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/876,244

(22) PCT Filed: Sep. 16, 2011

(86) PCT No.: PCT/JP2011/071213
§ 371 (c)(1),
(2), (4) Date: Apr. 22, 2013

(87) PCT Pub. No.: WO2012/043273
PCT Pub. Date: Apr. 5, 2012

(65) Prior Publication Data
US 2013/0225741 A1  Aug. 29, 2013

(30) Foreign Application Priority Data

Sep. 29, 2010 (JP) ................. 2010-219845

(51) Int. Cl.
*C08K 5/01* (2006.01)
*C08K 5/05* (2006.01)
*C08L 29/04* (2006.01)
*C09D 11/00* (2014.01)
*H01B 1/22* (2006.01)
*C08L 29/14* (2006.01)
*C08J 3/09* (2006.01)
*C04B 35/468* (2006.01)
*C04B 35/626* (2006.01)
*C04B 35/634* (2006.01)
*C09D 129/14* (2006.01)
*H01G 4/30* (2006.01)
*H01G 4/12* (2006.01)

(52) U.S. Cl.
CPC ............ *C08L 29/04* (2013.01); *C09D 11/00* (2013.01); *H01B 1/22* (2013.01); *C08L 29/14* (2013.01); *C08J 3/09* (2013.01); *C08J 2329/14* (2013.01); *C04B 35/4682* (2013.01); *C04B 35/6263* (2013.01); *C04B 35/6264* (2013.01); *C04B 35/6342* (2013.01); *C09D 129/14* (2013.01); *H01G 4/12* (2013.01); *C04B 2235/61* (2013.01); *H01G 4/30* (2013.01); *H01G 4/1218* (2013.01)

(58) Field of Classification Search
USPC ......... 524/401, 413, 428, 435, 501, 503, 379, 524/390
See application file for complete search history.

(56) References Cited

U.S. PATENT DOCUMENTS

| 2006/0014049 | A1 | 1/2006 | Ichinose et al. |
| 2006/0192180 | A1* | 8/2006 | Ichitani et al. ............. 252/500 |
| 2007/0262496 | A1 | 11/2007 | Frank et al. |
| 2009/0078358 | A1 | 3/2009 | Tonogai et al. |

FOREIGN PATENT DOCUMENTS

| EP | 1 816 112 | 8/2007 |
| JP | 60-239352 | 11/1985 |
| JP | 63-176359 | 7/1988 |
| JP | 4-145693 | 5/1992 |
| JP | 6-325971 | 11/1994 |
| JP | 8-26832 | 1/1996 |
| JP | 8-048567 | 2/1996 |
| JP | 10-67567 | 3/1998 |
| JP | 2002-104878 | 4/2002 |
| JP | 2002-348178 | 12/2002 |
| JP | 2005-139034 | 6/2005 |
| WO | 2004/101465 | 11/2004 |
| WO | 2010/113628 | 10/2010 |

OTHER PUBLICATIONS

International Search Report issued Dec. 13, 2011 in International (PCT) Application No. PCT/JP2011/071213.
Office Action issued Dec. 2, 2013 in corresponding European Application No. 10758404.7.
International Search Report issued Jun. 29, 2010 in International (PCT) Application No. PCT/JP2010/054380.
Supplementary European Search Report issued Jun. 26, 2012 in EP Application No. 10758404.7.
Zhang Jingxian et al., "Binary solvent mixture for tape casting of $TiO_2$ sheets", Journal of the European Ceramic Society, vol. 24, No. 1, pp. 147-155, Jan. 1, 2004.
Chae-Woong Cho et al., Effects of PVB on the gelation behavior of $BaTiO_3$-based dielectric particles and glass suspension, Journal of the European Ceramic Society, vol. 23, No. 13, pp. 2315-2322, Dec. 1, 2003.
Extended European Search Report issued May 22, 2014 in counterpart European Application No. 11828833.1.

* cited by examiner

*Primary Examiner* — David W Wu
*Assistant Examiner* — Marie Reddick
(74) *Attorney, Agent, or Firm* — Wenderoth, Lind & Ponack, L.L.P.

(57) ABSTRACT

The present invention provides a method for producing a slurry composition which realizes excellent dispersibility through simple steps and can maintain high dispersibility over a long term. In addition, the present invention provides a slurry composition produced using this method. The present invention provides a method for producing a slurry composition containing an inorganic powder, a polyvinyl acetal resin, and an organic solvent. The method contains the steps of mixing an inorganic powder, a mixed polyvinyl acetal resin (A) and an organic solvent (i) to prepare an inorganic dispersion; mixing a polyvinyl acetal resin (B) and an organic solvent (ii) to prepare a resin solution; and adding the resin solution to the inorganic dispersion.

5 Claims, No Drawings

METHOD FOR PRODUCING SLURRY COMPOSITION

TECHNICAL FIELD

The present invention relates to a method for simply producing a slurry composition which realizes excellent dispersibility and can maintain high dispersibility over a long term. In addition, the present invention also relates to a slurry composition produced using this method.

BACKGROUND ART

Polyvinyl acetal resins are excellent in toughness, film formation properties, properties for dispersing inorganic or organic powder such as pigments therein, and adhesiveness to the coated surface. Therefore, they are suitably used in, for example, ceramic green sheets and conductive pastes used for constituting multilayer ceramic capacitors, ink, paints, baking enamels, and wash primers.

Particularly, multilayer ceramic capacitors are normally produced through the following steps.

First, ceramic material powder is added to a binder resin such as a polyvinyl butyral resin, and they are uniformly mixed to produce a slurry composition. The slurry composition is applied to a surface of abase subjected to releasing treatment in advance. The applied slurry composition is heated so that volatiles such as solvents therein are removed, and then peeled from the base to produce a ceramic green sheet. Then, a conductive paste containing ethyl cellulose, a polyvinyl butyral resin, or the like as a binder resin is applied to the obtained ceramic green sheet by screen printing. A plurality of such sheets are alternately laminated and thermocompressed to each other. The obtained lamination is degreased and fired to produce a ceramic fired body. On end faces of the ceramic fired body, external electrodes are sintered. In this manner, multilayer ceramic capacitors are produced.

Recent needs for downsized multilayer ceramic capacitors with higher capacity lead to studies to achieve further increase in the number of layers and further reduction in film thickness. In such multilayer ceramic capacitors, ceramic green sheets have become thinner and thinner. Along with this, ceramic powder to be used is required to have a smaller particle size.

A common method for dispersing ceramic powder and the like in a slurry composition, as disclosed in Patent Literature 1, comprises the following steps. An inorganic dispersion comprising an inorganic powder and an organic solvent is prepared. Separately, a resin solution comprising a binder resin dissolved therein is prepared. Then, the inorganic dispersion and the resin solution are mixed.

However, this method requires stirring of a liquid mixture for a long time to avoid insufficient dispersion of ceramic powder. Such stirring problematically consumes excessive energy and time.

Further, a method for ensuring the dispersibility of ceramic powder in the slurry composition include, as disclosed in Patent Literature 2, a method of adding a dispersant. However, in a case where the used dispersant has poor compatibility with the binder resin, this method may lower the dispersibility.

In producing a multilayer ceramic capacitor, a ceramic slurry composition produced may be stored for several days before application. In this case, if the long-term dispersion stability of the slurry is insufficient, a ceramic green sheet to be obtained has reduced strength and larger surface irregularities due to reduction in the dispersibility. This causes a problem of reduction in electric properties of a multilayer ceramic capacitor to be obtained.

CITATION LIST

Patent Literature

Patent Literature 1: JP-A 2005-139034
Patent Literature 2: JP-A H06-325971

SUMMARY OF INVENTION

Technical Problem

The present invention was made in view of the above-mentioned state of the art, and an object thereof is to provide a method for simply producing a slurry composition which realizes excellent dispersibility and can maintain high dispersibility over a long term. In addition, another object of the present invention is to provide a slurry composition produced using this method.

Solution to Problem

The present invention provides a method for producing a slurry composition that contains an inorganic powder, a polyvinyl acetal resin, and an organic solvent, the method comprising the steps of: mixing an inorganic powder, a mixed polyvinyl acetal resin (A) and an organic solvent for inorganic dispersion to prepare an inorganic dispersion; mixing a polyvinyl acetal resin (B) and an organic solvent for resin solution to prepare a resin solution; and adding the resin solution to the inorganic dispersion, the mixed polyvinyl acetal resin (A) including a polyvinyl acetal resin (a1) having a hydroxy group content of 20 to 40 mol % and a polyvinyl acetal resin (a2) having a hydroxy group content of 28 to 60 mol %, the polyvinyl acetal resin (a1) and the polyvinyl acetal resin (a2) being in a relation represented by the below formula (I): wherein X represents the hydroxy group content (mol %) in the polyvinyl acetal resin (a1), and Y represents the hydroxy group content (mol %) in the polyvinyl acetal resin (a2), the polyvinyl acetal resin (B) having a polymerization degree of 800 to 4200, and the amount of the mixed polyvinyl acetal resin (A) used in the step of preparation of the inorganic dispersion being 0.1 to 20 parts by weight relative to 100 parts by weight of the inorganic powder.

In the following, the present invention is described in detail.

The present inventor made various investigations to find out the following. Use of a mixed polyvinyl acetal resin including polyvinyl acetal resins each having different hydroxy group content and being in a predetermined relation as a dispersant in a method for producing a slurry composition significantly enhances the dispersibility of an inorganic powder and enables production of a slurry composition which can maintain high dispersibility over a long term. Here, the method comprises the steps of: preparing an inorganic dispersion comprising an inorganic powder, an organic solvent for inorganic dispersion, and a dispersant; preparing a resin solution comprising a binder resin dissolved therein; and mixing the inorganic dispersion and the resin solution. Accordingly, the present invention was completed.

In the present invention, the method comprises the steps of: mixing an inorganic powder, a mixed polyvinyl acetal resin (A), and an organic solvent for inorganic dispersion to prepare an inorganic dispersion; mixing a polyvinyl acetal resin (B) and an organic solvent for resin solution to prepare a resin solution; and adding the resin solution to the inorganic dispersion.

In the present invention, a mixed polyvinyl acetal resin (A) is used as a dispersant in the step of preparation of the inorganic dispersion. Use of a mixed polyvinyl acetal resin (A) as a dispersant in the step of preparation of the inorganic dispersion allows adhesion of the mixed polyvinyl acetal resin (A) on the surface of an inorganic powder. As a result, the dispersibility of the inorganic powder is enhanced. When a resin solution containing a polyvinyl acetal resin (B) is subsequently added to the inorganic dispersion, steric hindrance caused by the mixed polyvinyl acetal resin (A) that has adhered to the inorganic powder prevents adhesion of the polyvinyl acetal resin (B) to the inorganic powder. Thus, the strength of a sheet obtainable when the resulting composition is formed into a green sheet, for example, can be enhanced without deteriorating the dispersibility of the inorganic powder.

Accordingly, high strength derived from the polyvinyl acetal resin (B) can be exhibited without deteriorating excellent dispersibility of the mixed polyvinyl acetal resin (A). This enables production of a slurry composition in which an inorganic powder is favorably dispersed and which is capable of providing a film with excellent strength.

In contrast, in the case of adding the mixed polyvinyl acetal resin (A) and the polyvinyl acetal resin (B) at the same time, the polyvinyl acetal resin (B) adheres to the surface of an inorganic powder. This results in aggregation of the inorganic powder, leading to a significant reduction in dispersibility of the inorganic powder.

In the step of preparation of the inorganic dispersion, it is preferable to dissolve the mixed polyvinyl acetal resin (A) in an organic solvent for inorganic dispersion prior to the addition of an inorganic powder.

Here, the mixed polyvinyl acetal resin (A) may be previously prepared. Alternatively, components of the mixed polyvinyl acetal resin (A) may be mixed when adding an inorganic powder.

In the step of preparation of the inorganic dispersion in the present invention, the mixed polyvinyl acetal resin (A) is used as a dispersant. Use of the mixed polyvinyl acetal resin (A) which is of the same kind as the binder resin, as a dispersant, eliminates the conventional need to consider the adverse effect caused by the added dispersant. This is because a dispersant and a binder resin being the same in kind have favorable compatibility with each other, and thereby can be mixed and not separate.

In the present description, the mixed polyvinyl acetal resin (A) and the polyvinyl acetal resin (B) described below are simply referred to as polyvinyl acetal resins if no distinction is needed between them.

In the present invention, the mixed polyvinyl acetal resin (A) includes different kinds of polyvinyl acetal resins, polyvinyl acetal resin (a1) and polyvinyl acetal resin (a2). The polyvinyl acetal resin (a1) allows easy separation of an aggregate of an inorganic powder, and the polyvinyl acetal resin (a2) has a tendency to adhere to the surface of the inorganic powder. The synergistic effect of these resins enables to improve dispersibility of the inorganic powder significantly.

In the present invention, the inorganic dispersion may eventually contain a mixed polyvinyl acetal resin (A) including a polyvinyl acetal resin (a1) and a polyvinyl acetal resin (a2). A polyvinyl acetal resin (a1) and a polyvinyl acetal resin (a2) may be added at the same time, or added separately to provide a mixed polyvinyl acetal resin (A).

Here, by adding a polyvinyl acetal resin (a1) and a polyvinyl acetal resin (a2) separately, effects of these resins are likely to be exhibited more remarkably.

The mixed polyvinyl acetal resin (A) includes a polyvinyl acetal resin (a1). A polyvinyl acetal resin (A) including a polyvinyl acetal resin (a1) allows easy separation of an aggregate of the inorganic powder, since the polyvinyl acetal resin (a1) penetrates the surface of the inorganic powder quickly.

With respect to the hydroxy group content in the polyvinyl acetal resin (a1), the lower limit is 20 mol % and the upper limit is 40 mol %. A polyvinyl acetal resin (a1) having a hydroxy group content of less than 20 mol % has almost no compatibility with the surface of an inorganic powder and thereby is less likely to adhere to the surface of the inorganic powder, failing to enhance the dispersibility. A polyvinyl acetal resin (a1) having a hydroxy group content of more than 40 mol % adheres to the surface of an inorganic powder excessively and adheres only to the surface of an aggregate of the inorganic powder, leading to difficulty in separation of the aggregate. Preferably, the lower limit is 26 mol % and the upper limit is 38 mol %.

With respect to the polymerization degree of the polyvinyl acetal resin (a1), the preferable lower limit is 20, and the preferable upper limit is 450. If the polymerization degree is lower than 20, such a polyvinyl acetal resin (a1) may be difficult to obtain industrially. If the polymerization degree is higher than 450, such a polyvinyl acetal resin (a1) may be less likely to penetrate the surface of an inorganic powder due to its bulkiness. The more preferable lower limit is 100, and the more preferable upper limit is 300.

The mixed polyvinyl acetal resin (A) includes a polyvinyl acetal resin (a2). A polyvinyl acetal resin (A) including a polyvinyl acetal resin (a2) enables to store a slurry composition to be obtained stably over along term, because the polyvinyl acetal resin (a2) adheres to the surface of an inorganic powder strongly.

With respect to the hydroxy group content in the polyvinyl acetal resin (a2), the lower limit is 28 mol % and the upper limit is 60 mol %. A polyvinyl acetal resin (a2) having a hydroxy group content of lower than 28 mol % has insufficient compatibility with the surface of an inorganic powder, and thereby insufficient amount of the polyvinyl acetal resin (a2) adheres to the surface of the inorganic powder, failing to enhance the dispersibility. A polyvinyl acetal resin (a2) having a hydroxy group content of higher than 60 mol % has insufficient solubility in a solvent, and thus molecules cannot spread sufficiently. This may prevents adhesion of the polyvinyl acetal resin (a2) to the surface of an inorganic powder. Preferably, the lower limit is 42 mol % and the upper limit is 55 mol %.

With respect to the polymerization degree of the polyvinyl acetal resin (a2), the preferable lower limit is 200, and the preferable upper limit is 600. If the polymerization degree is lower than 200, such a polyvinyl acetal resin (a2) may have insufficient bulkiness, leading to difficulty in keeping an appropriate distance between inorganic powder particles. If the polymerization degree is higher than 600, such a polyvinyl acetal resin (a2) has too high aggregability and thus may have difficulty in exhibiting sufficient dispersibility. The more preferable lower limit is 320, and the more preferable upper limit is 450.

The polyvinyl acetal resin (a2) preferably comprises an anionic group.

A polyvinyl acetal resin (a2) comprising an anionic group is more likely to adhere to the surface of an inorganic powder to enhance the dispersibility of the inorganic powder.

The anionic group is not particularly limited, provided that it is an anionic modifying group. Examples thereof include a carboxy group, a sulfonate group, and a phosphate group.

With respect to the modification degree with the anionic group, the lower limit is preferably 0.1 mol % and the upper limit is preferably 2 mol %.

In a case where the modification degree with the anionic group is less than 0.1 mol %, such a polyvinyl acetal resin (a2) is less likely to adhere to the surface of an inorganic powder, failing to enhance the dispersibility. In a case where the modification degree with the anionic group is more than 2 mol %, such a polyvinyl acetal resin (a2) is less likely to adhere to the surface of an inorganic powder because of attractive interaction between molecules of the polyvinyl acetal resin (a2). More preferably, the lower limit is 0.2 mol % and the upper limit is 1 mol %.

The modification degree is obtained through a procedure comprising the steps of: dissolving the polyvinyl acetal resin (a2) in DMSO-$d_6$ (dimethylsulfoxide); measuring $^{13}$C-NMR spectrum thereof; and calculating the modification degree based on the peak area derived from a methine group coupling with a carboxy group and the peak area derived from a methine group in a portion acetalized.

A polyvinyl acetal resin (a1) and a polyvinyl acetal resin (a2) in the mixed polyvinyl acetal resin (A) are in a relation represented by the below formula (1).

$$Y-X \geq 5 \tag{1}$$

wherein X represents the hydroxy group content (mol %) in the polyvinyl acetal resin (a1), and Y represents the hydroxy group content (mol %) in the polyvinyl acetal resin (a2).

Since being in the above relation, the polyvinyl acetal resin (a1) and the polyvinyl acetal resin (a2) have different levels of adhesiveness to the surface of the inorganic powder. Thus, an aggregate of the inorganic powder is efficiently separated. Further, the condition can be maintained.

The ratio (molar ratio) between a polyvinyl acetal resin (a1) and a polyvinyl acetal resin (a2) in the mixed polyvinyl acetal resin (A) is preferably 2:8 to 8:2. If the ratio is within the range, effects of the polyvinyl acetal resin (a1) and the polyvinyl acetal resin (a2) can be exhibited sufficiently.

In a polyvinyl acetal resin (a1) and a polyvinyl acetal resin (a2) in the mixed polyvinyl acetal resin (A), the ratio between a portion acetalized by acetaldehyde and a portion acetalized by butyl aldehyde is preferably 30/70 to 95/5. In the portion acetalized by acetaldehyde, the length of a hydrocarbon group derived from aldehyde is shorter. This lowers the steric hindrance and may allow easier adhesion of hydroxy groups to the inorganic powder. Accordingly, the above ratio of 30/70 or more enhances the dispersibility of the inorganic powder and enables to maintain high dispersibility over a long term. The above ratio is more preferably 40/60 to 80/20.

The inorganic powder is not particularly limited and examples thereof include metal powder, conductive powder, ceramic powder, and glass powder.

In a case where conductive powder is used as the inorganic powder, the slurry composition may be used as a conductive paste.

The conductive powder is not particularly limited, provided that the powder shows sufficient conductivity. Examples thereof include powder comprising nickel, palladium, platinum, gold, silver, copper, or alloys of these. Each kind of the conductive powder may be used alone, or two or more kinds may be used in combination.

In a case where ceramic powder is used as the inorganic powder, the slurry composition may be used as a ceramic paste. The ceramic powder is not particularly limited and examples thereof include powder comprising alumina, zirconia, aluminum silicate, titanium oxide, zinc oxide, barium titanate, magnesia, sialon, spinel mullite, silicon carbide, silicon nitride, or aluminum nitride. Particularly, the ceramic powder preferably comprises the same component as the ceramic powder contained in the ceramic green sheet to be used. Each kind of the ceramic powder may be used alone, or two or more kinds may be used in combination.

In a case where glass powder is used as the inorganic powder, the slurry composition may be used as a glass paste. The glass powder is not particularly limited and examples thereof include lead oxide-boron oxide-silicon oxide-calcium oxide glass, zinc oxide-boron oxide-silicon oxide glass, and lead oxide-zinc oxide-boron oxide-silicon oxide glass. Each kind of the glass powder may be used alone, or two or more kinds may be used in combination. Further, aluminum oxide and the like may be used in combination, to the extent that the object of the present invention is not impaired.

In a case where magnetic powder is used as the inorganic powder, the slurry composition may be used as a magnetic material paste. The magnetic powder is not particularly limited and examples thereof include ferrites such as manganese zinc ferrite, nickel zinc ferrite, copper zinc ferrite, barium ferrite, and strontium ferrite, metal oxides such as chrome oxide, metallic magnetics such as cobalt, and amorphous magnetics. Each kind of the magnetic powder may be used alone, or two or more kinds may be used in combination.

With respect to the amount of the mixed polyvinyl acetal resin (A) added in the step of preparation of the inorganic dispersion, the lower limit is 0.1 parts by weight and the upper limit is 20 parts by weight, relative to 100 parts by weight of the inorganic powder. An amount of less than 0.1 parts by weight may cause insufficient dispersibility of the inorganic powder, for example. In contrast, an amount of more than 20 parts by weight may cause too-high viscosity of the inorganic dispersion which leads to the poor handleability thereof. Preferably, the lower limit is 0.6 parts by weight and the upper limit is 15 parts by weight. More preferably, the lower limit is one part by weight and the upper limit is 10 parts by weight. Particularly, 0.6 parts by weight or more of the mixed polyvinyl acetal resin (A) allows sufficient adhesion thereof to the surface of the inorganic powder, and therefore, the inorganic powder in the ceramic slurry is allowed to be more finely dispersed.

In the step of preparation of the inorganic dispersion, the moisture content in the inorganic dispersion is preferably less than 3% by weight. If the moisture content is more than 3% by weight, high dispersibility may not be maintained over a long term. The moisture content is preferably less than 1% by weight.

In the present invention, the subsequent step is mixing of a polyvinyl acetal resin (B) and an organic solvent for resin solution to prepare a resin solution.

In the present invention, the resin solution is thus prepared, and then added to an inorganic dispersion in the subsequent step. This prevents aggregation of the inorganic powder and thereby allows the inorganic powder to disperse more finely.

On the other hand, in the case that the polyvinyl acetal resin (B) is not dissolved in an organic solvent for a resin solution, that is, in the case that the resin solution is not prepared, the polyvinyl acetal resin (B) is bulky and likely to take in a plurality of inorganic powder particles, leading to aggregation of the inorganic powder.

With respect to the polymerization degree of the polyvinyl acetal resin (B), the lower limit is 800 and the upper limit is 4200. A polyvinyl acetal resin (B) having a polymerization degree of lower than 800 causes insufficient sheet strength when used in a green sheet. In contrast, a polyvinyl acetal resin (B) having a polymerization degree of more than 4200 makes the viscosity of the slurry composition too high, resulting in the lowered coating property of the slurry composition. Preferably, the lower limit is 1200 and the upper limit is 3500.

With respect to the hydroxy group content in the polyvinyl acetal resin (B), the lower limit is preferably 22 mol % and the upper limit is preferably 42 mol %. A hydroxy group content of less than 22 mol % may cause insufficient sheet strength when a slurry containing such a polyvinyl acetal resin is used in producing a green sheet. A hydroxy group content of more than 42 mol % may cause aggregation of the inorganic powder particles. More preferably, the lower limit is 28 mol % and the upper limit is 40 mol %.

With respect to the amount of the polyvinyl acetal resin (B) added in the step of preparation of the resin solution, the lower limit is preferably 5 parts by weight and the upper limit is preferably 20 parts by weight, relative to 100 parts by weight of the inorganic powder. An amount of less than 5 parts by weight may cause insufficient dispersibility of the inorganic powder and insufficient strength, flexibility and adhesiveness of a dried film, for example. An amount of more than 20 parts by weight may cause too-high viscosity or a lowered coating property, resulting in poor handleability of the resin solution.

In producing a thin-layer ceramic green sheet which especially requires high strength, mixing of the polyvinyl acetal resin (B) with a high polymerization degree and the mixed polyvinyl acetal resin (A) with a low polymerization degree allows production of a ceramic green sheet having sufficient dispersibility and sheet strength.

The polyvinyl acetal resins are obtainable by acetalizing polyvinyl alcohols with aldehydes.

The polyvinyl alcohols are obtainable by, for example, saponifying copolymers of vinyl esters and ethylene. Examples of the vinyl esters include vinyl formate, vinyl acetate, vinyl propionate, and vinyl pivalate. Among these, vinyl acetate is preferable from an economic perspective.

The polyvinyl alcohols may be obtained by copolymerization using ethylenically unsaturated monomers to the extent that the effects of the present invention are not impaired. The ethylenically unsaturated monomers are not particularly limited and examples thereof include acrylic acid, methacrylic acid, (anhydrous) phthalic acid, (anhydrous) maleic acid, (anhydrous) itaconic acid, acrylonitrile, methacrylonirile, acrylamide, methacrylamide, trimethyl-(3-acrylamide-3-dimethylpropyl)-ammonium chloride, acrylamide-2-methylpropanesulfonic acid, and sodium salts of these, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, and sodium allylsulfonate. Additionally, terminal-modified polyvinyl alcohols may also be used, which are obtainable by copolymerizing vinyl ester monomers such as vinyl acetate and ethylene in the presence of thiol compounds such as thiol acetate and mercaptopropionate and saponifying the resulting copolymers.

The polyvinyl alcohols may be prepared by copolymerizing the vinyl esters and α-olefins and saponifying the resulting copolymers. The polyvinyl alcohols may be further obtainable by copolymerization using the ethylenically unsaturated monomers to contain a component derived from the ethylenically unsaturated monomers. Further, terminal-modified polyvinyl alcohols may be used, which is obtainable by copolymerizing vinyl ester monomers such as vinyl acetate and α-olefins in the presence of thiol compounds such as thiol acetate and mercaptopropionate and saponifying the resulting copolymers. The α-olefins are not particularly limited and examples thereof include methylene, ethylene, propylene, isopropylene, butylene, isobutylene, pentylene, hexylene, cyclohexylene, cyclohexyl ethylene, and cyclohexyl propylene.

The polyvinyl acetal resins preferably have an acetalization degree of 40 to 80 mol %. Polyvinyl acetal resins with an acetalization degree of less than 40 mol % have lowered solubility in organic solvents, failing to be suitably used in slurry compositions. Polyvinyl acetal resins with an acetalization degree of more than 80 mol % are less likely to be produced on an industrial scale. Preferably, the acetalization degree is 50 to 75 mol %.

In the present description, the acetalization degree refers to the proportion of the number of hydroxy groups acetalized by butyl aldehyde in the number of hydroxy groups of the polyvinyl alcohol. Since an acetal group in the polyvinyl acetal resin is formed by two acetalized hydroxy groups, the acetalization degree in mol % is calculated by counting the two acetalized hydroxy groups.

The subsequent step in the present invention is adding the resin solution to the inorganic dispersion.

In this manner, a slurry composition is prepared.

In the method for producing a slurry composition of the present invention, other resins such as polyvinyl acetal resins other than the above-mentioned polyvinyl acetal resins, acrylic resins, and ethyl cellulose may be used, to the extent that the effects of the present invention are not impaired. However, the amount of the above-mentioned polyvinyl acetal resins needs to be 50% by weight or more in the total amount of all binder resins.

The organic solvent for inorganic dispersion and the organic solvent for resin solution are not particularly limited and organic solvents commonly used in slurry compositions may be used. Examples thereof include: ketones such as acetone, methyl ethyl ketone, dipropyl ketone, and diisobutyl ketone; alcohols such as methanol, ethanol, isopropanol, and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate; and terpineols such as terpineol, dihydroterpineol, terpineol acetate, and dihydroterpineol acetate, and their derivatives. Each of these organic solvents may be used alone, or two or more of these may be used in combination.

In particular, a mixed solvent comprising ethanol and toluene is preferably used as the organic solvent for inorganic dispersion and the organic solvent for resin solution. Use of this mixed solvent significantly enhances the dispersibility of the obtainable slurry composition. Since ethanol prevents aggregation of the polyvinyl acetal resin (B) and toluene accelerates adhesion of the mixed polyvinyl acetal resin (A) to the surface of the inorganic powder, the synergy effect of these presumably leads to the significant enhancement of the dispersibility of the slurry composition.

The mixing ratio of ethanol and toluene in the case of using the mixed solvent is preferably 5:5 to 2:8. The mixing ratio within this range significantly enhances the dispersibility of the slurry composition.

With respect to the amount of the organic solvent for inorganic dispersion to be added in the step of preparation of the inorganic dispersion, the lower limit is preferably 20 parts by weight and the upper limit is preferably 60 parts by weight, relative to 100 parts by weight of the inorganic powder. An amount of less than 20 parts by weight increases the viscosity of the inorganic dispersion. This may limit the movement of inorganic powder, leading to a failure in obtaining sufficient dispersibility. An amount of more than 60 parts by weight lowers the concentration of the inorganic powder in the inorganic dispersion. This may reduce the number of collisions between the inorganic powder particles, leading to a failure in obtaining sufficient dispersibility.

With respect to the amount of the organic solvent for resin solution to be added in the step of preparation of the resin solution, the lower limit is preferably 70 parts by weight and the upper limit is preferably 130 parts by weight, relative to 100 parts by weight of the inorganic powder. If the amount is less than 70 parts by weight, the amount of resin is insufficient. This may result in a green sheet with insufficient strength. If the amount is more than 130 parts by weight, the amount of resin in the green sheet is large. This may result in a large amount of residue during a firing process.

In the method for producing a slurry composition of the present invention, a plasticizer, a lubricant, an antistatic agent and the like may be appropriately added, to the extent that the effects of the present invention are not impaired.

The method for producing a slurry composition of the present invention allows excellently high dispersibility and produces a slurry composition which gives a film with excellent strength. Such a slurry composition is another aspect of the present invention.

Advantageous Effect of Invention

The present invention provides a method for simply producing a slurry composition which can maintain high dispersibility over a long term. The present invention also provides a slurry composition produced using this method.

BRIEF DESCRIPTION OF EMBODIMENT

Hereinafter, the present invention will be described in more detail by way of examples, but the present invention is not limited to these examples.

(Synthesis of Polyvinyl Acetal Resins (a1) [(a1-1) to (a1-9)])

An amount of 350 parts by weight of polyvinyl alcohol with a polymerization degree of 250 and a saponification degree of 99 mol % was added to 3000 parts by weight of pure water. The mixture was stirred at 90° C. for about two hours so that the polyvinyl alcohol was dissolved. The obtained solution was cooled to 40° C. To the solution, 230 parts by weight of hydrochloric acid having a concentration of 35% by weight was added, and the temperature of the obtained mixture was cooled to 0° C. Then, 205 parts by weight of n-butyl aldehyde was added. The obtained mixture was maintained at 0° C. while being subjected to acetalization so that reaction products were precipitated. Subsequently, the solution temperature was maintained at 20° C. for three hours so that the reaction was completed. Then, the solution was neutralized, rinsed, and dried by a common method. Consequently, a polyvinyl acetal resin (a1-1) in the form of white powder was obtained. The obtained polyvinyl acetal resin was dissolved in DMSO-$d_6$ (dimethylsulfoxide) and the butyralization degree, the amount of a hydroxy group, and the amount of an acetyl group were measured using $^{13}$C-NMR (nuclear magnetic resonance spectrum). The obtained butyralization degree was 69 mol %, the obtained amount of a hydroxy group was 30 mol %, and the obtained amount of an acetyl group was 1 mol %. Polyvinyl acetal resins (a1-2) to (a1-9) were synthesized in the same manner as the polyvinyl acetal resin (a1-1), except that conditions shown in Table 1 were satisfied.

TABLE 1

| | Conditions for producing polyvinyl acetal resin (a1) | | | | | | | |
|---|---|---|---|---|---|---|---|---|
| | Polyvinyl alcohol | | | | | Amount of n-butyl-aldehyde (parts by weight) | Amount of 35% by weight hydrochloric acid (parts by weight) | Input temperature of n-butyl-aldehyde (° C.) |
| Name | Polymerization degree | Saponification degree (mol %) | Modification degree (mol %) | Amount (parts by weight) | Amount (parts by weight) | | | |
| a1-1 | 250 | 99 | — | 350 | 3000 | 212 | 230 | 0 |
| a1-2 | 250 | 99 | — | 350 | 3000 | 245 | 300 | 0 |
| a1-3 | 250 | 99 | — | 350 | 3000 | 260 | 300 | 0 |
| a1-4 | 250 | 99 | — | 350 | 3000 | 184 | 230 | 0 |
| a1-5 | 250 | 99 | — | 350 | 3000 | 178 | 230 | 0 |
| a1-6 | 10 | 99 | — | 350 | 3000 | 212 | 230 | 0 |
| a1-7 | 25 | 99 | — | 350 | 3000 | 212 | 200 | 0 |
| a1-8 | 440 | 99 | — | 350 | 3000 | 212 | 230 | 2 |
| a1-9 | 460 | 99 | — | 350 | 3000 | 212 | 230 | 2 |

| | Conditions for producing polyvinyl acetal resin (a1) | | Polyvinyl acetal resin (a1) | | | |
|---|---|---|---|---|---|---|
| Name | Maintained temperature after precipitation (° C.) | Maintained time after precipitation (hours) | Amount of hydroxyl group (mol %) | Acetalization degree (mol %) | Amount of acetyl group (mol %) | Anionic modification degree (mol %) |
| a1-1 | 20 | 3 | 30 | 69 | 1 | — |
| a1-2 | 20 | 3 | 21 | 78 | 1 | — |
| a1-3 | 20 | 3 | 19 | 80 | 1 | — |
| a1-4 | 20 | 3 | 39 | 80 | 1 | — |
| a1-5 | 20 | 3 | 41 | 58 | 1 | — |
| a1-6 | 35 | 3 | 30 | 69 | 1 | — |
| a1-7 | 20 | 3 | 30 | 69 | 1 | — |
| a1-8 | 20 | 3 | 30 | 69 | 1 | — |
| a1-9 | 35 | 3 | 30 | 69 | 1 | — |

(Synthesis of Polyvinyl Acetal Resins (a2) [(a2-1) to (a2-10)])

An amount of 350 parts by weight of polyvinyl alcohol with a polymerization degree of 320 and a saponification degree of 99 mol % was added to 3000 parts by weight of pure water. The mixture was stirred at 90° C. for about two hours so that the polyvinyl alcohol was dissolved. The obtained solution was cooled to 40° C. To the solution, 230 parts by weight of hydrochloric acid having a concentration of 35% by weight was added, and the obtained mixture was cooled to 1° C. Then, 150 parts by weight of n-butyl aldehyde was added. The obtained mixture was maintained at 1° C. while being subjected to acetalization so that reaction products were precipitated. Subsequently, the solution temperature was maintained at 20° C. for three hours so that the reaction was completed. Then, the solution was neutralized, rinsed, and dried by a common method. Consequently, a polyvinyl acetal resin (a2-1) in the form of white powder was obtained. The obtained polyvinyl acetal resin was dissolved in DMSO-$d_6$ (dimethylsulfoxide) and the butyralization degree, the amount of a hydroxy group, and the amount of an acetyl group were measured using $^{13}$C-NMR (nuclear magnetic resonance spectrum). The obtained butyralization degree was 51 mol %, the obtained amount of a hydroxy group was 48 mol %, and the obtained amount of an acetyl group was 1 mol %.

Also, polyvinyl acetal resins (a2-2) to (a2-10) were synthesized in the same manner as the polyvinyl acetal resin (a2-1), except that conditions shown in Table 2 were satisfied.

(Synthesis of Polyvinyl Acetal Resins (B) [(B1) to (B12)])

An amount of 280 parts by weight of polyvinyl alcohol with a polymerization degree of 1700 and a saponification degree of 99 mol % was added to 3000 parts by weight of pure water. The mixture was stirred at 90° C. for about two hours so that the polyvinyl alcohol was dissolved. The obtained solution was cooled to 10° C. To the solution, 200 parts by weight of hydrochloric acid having a concentration of 35% by weight and 155 parts by weight of n-butyl aldehyde were added. The solution was further cooled to 1° C. and maintained at that temperature while being subjected to acetalization so that reaction products were precipitated. Subsequently, the solution temperature was maintained at 40° C. for three hours so that the reaction was completed. Then, the solution was neutralized, rinsed, and dried by a common method. Consequently, a polyvinyl acetal resin (B1) in the form of white powder was obtained. The obtained polyvinyl acetal resin was dissolved in DMSO-$d_6$ (dimethylsulfoxide) and the butyralization degree, the amount of a hydroxy group, and the amount of an acetyl group were measured using a $^{13}$C-NMR (nuclear magnetic resonance spectrum). The obtained degree of butyralization was 66 mol %, the obtained amount of a hydroxy group was 33 mol %, and the obtained amount of an acetyl group was 1 mol %.

Polyvinyl acetal resins (B2) to (B12) were synthesized in the same manner as the polyvinyl acetal resin (B1), except that conditions shown in Table 3 were satisfied.

TABLE 2

Conditions for producing polyvinyl acetal resin (a2)

| | Polyvinyl alcohol | | | | | Amount of n-butyl-aldehyde (parts by weight) | Amount of 35% by weight hydrochloric acid (parts by weight) | Input temperature of n-butyl-aldehyde (° C.) |
|---|---|---|---|---|---|---|---|---|
| Name | Polymerization degree | Saponification degree (mol %) | Modification degree (mol %) | Amount (parts by weight) | Amount (parts by weight) | | | |
| a2-1 | 320 | 99 | — | 350 | 3000 | 157 | 230 | 1 |
| a2-2 | 320 | 99 | — | 350 | 3000 | 215 | 230 | 1 |
| a2-3 | 320 | 99 | — | 350 | 3000 | 221 | 230 | 1 |
| a2-4 | 320 | 99 | — | 350 | 3000 | 123 | 230 | 1 |
| a2-5 | 320 | 99 | — | 350 | 3000 | 118 | 230 | 1 |
| a2-6 | 320 | 99 | 1 | 350 | 3000 | 163 | 230 | 1 |
| a2-7 | 180 | 99 | — | 350 | 3000 | 157 | 230 | 1 |
| a2-8 | 210 | 99 | — | 350 | 3000 | 157 | 230 | 1 |
| a2-9 | 590 | 99 | — | 350 | 3000 | 157 | 230 | 1 |
| a2-10 | 610 | 99 | — | 350 | 3000 | 157 | 230 | 1 |

| | Conditions for producing polyvinyl acetal resin (a2) | | Polyvinyl acetal resin (a2) | | | |
|---|---|---|---|---|---|---|
| | Maintained | | | | | |
| Name | Maintained temperature after precipitation (° C.) | Maintained time after precipitation (hours) | Amount of hydroxyl group (mol %) | Acetalization degree (mol %) | Amount of acetyl group (mol %) | Anionic modification degree (mol %) |
| a2-1 | 20 | 3 | 48 | 51 | 1 | — |
| a2-2 | 20 | 3 | 29 | 70 | 1 | — |
| a2-3 | 20 | 3 | 27 | 72 | 1 | — |
| a2-4 | 20 | 3 | 59 | 40 | 1 | — |
| a2-5 | 20 | 3 | 61 | 38 | 1 | — |
| a2-6 | 20 | 3 | 45 | 53 | 1 | 1 |
| a2-7 | 20 | 3 | 48 | 51 | 1 | — |
| a2-8 | 20 | 3 | 48 | 51 | 1 | — |
| a2-9 | 20 | 3 | 48 | 51 | 1 | — |
| a2-10 | 20 | 3 | 48 | 51 | 1 | — |

TABLE 3

| | Polyvinyl alcohol | | | Amount of pure water (parts by weight) | Amount of n-butyl-aldehyde (parts by weight) | Amount of 35% by weight hydrochloric acid (parts by weight) | Input temperature of n-butyl-aldehyde (° C.) |
|---|---|---|---|---|---|---|---|
| Name | Polymer-ization degree | Saponifi-cation degree (mol %) | Amount (parts by weight) | | | | |
| B1 | 1700 | 99 | 280 | 3000 | 155 | 200 | 10 |
| B2 | 850 | 99 | 280 | 3000 | 155 | 200 | 5 |
| B3 | 2000 | 99 | 280 | 3000 | 158 | 230 | 12 |
| B4 | 4100 | 99 | 280 | 3000 | 155 | 220 | 14 |
| B5 | 750 | 99 | 280 | 3000 | 155 | 200 | 10 |
| B6 | 4300 | 99 | 280 | 3000 | 155 | 200 | 10 |
| B7 | 2000 | 99 | 280 | 3000 | 173 | 200 | 10 |
| B8 | 1700 | 99 | 280 | 3000 | 168 | 200 | 10 |
| B9 | 2000 | 99 | 280 | 3000 | 202 | 200 | 10 |
| B10 | 1700 | 99 | 280 | 3000 | 230 | 200 | 10 |
| B11 | 1700 | 99 | 280 | 3000 | 140 | 200 | 10 |
| B12 | 1700 | 99 | 280 | 3000 | 135 | 200 | 10 |

| | Conditions for producing polyvinyl acetal resin (B) | | Polyvinyl acetal resin (B) | | | |
|---|---|---|---|---|---|---|
| Name | Maintained temperature after precipitation (° C.) | Maintained time after precipitation (hours) | Polymer-ization degree | Amount of hydroxyl group (mol %) | Acetal-ization degree (mol %) | Amount of acetyl group (mol %) |
| B1 | 40 | 3 | 1700 | 33 | 66 | 1 |
| B2 | 40 | 3 | 850 | 33 | 66 | 1 |
| B3 | 35 | 3 | 2000 | 32 | 67 | 1 |
| B4 | 40 | 3 | 4100 | 33 | 66 | 1 |
| B5 | 40 | 3 | 750 | 33 | 66 | 1 |
| B6 | 40 | 3 | 4300 | 33 | 66 | 1 |
| B7 | 40 | 3 | 2000 | 27 | 72 | 1 |
| B8 | 40 | 3 | 1700 | 29 | 70 | 1 |
| B9 | 40 | 3 | 2000 | 23 | 76 | 1 |
| B10 | 40 | 3 | 1700 | 21 | 78 | 1 |
| B11 | 40 | 3 | 1700 | 41 | 58 | 1 |
| B12 | 40 | 3 | 1700 | 43 | 56 | 1 |

Example 1

Preparation of Inorganic Dispersion

An amount of 0.5 parts by weight of the polyvinyl acetal resin (a1) and 0.5 parts by weight of the polyvinyl acetal resin (a2) shown in Table 4 were added to a mixed solvent comprising 25 parts by weight of toluene and 25 parts by weight of ethanol and stirred to be dissolved therein. Subsequently, 100 parts by weight of barium titanate powder (product of SAKAI CHEMICAL INDUSTRY CO., LTD., BT01) was added to the obtained solution. Then, 80 mL of a 2-mm diameter ceramic ball was added. The mixture was stirred by a ball mill (product of SEIWA GIKEN CO., Ltd., BM-10) at 60 rpm for 300 minutes to produce an inorganic dispersion.

Preparation of Resin Solution

An amount of 8 parts by weight of the obtained polyvinyl acetal resin (B1) and 2 parts by weight of DOP were added to a mixed solvent comprising 45 parts by weight of ethanol and 45 parts by weight of toluene. The mixture was stirred so that the added components were dissolved. In this manner, a resin solution was prepared.

Preparation of Slurry Composition

The resin solution was added to the inorganic dispersion and the mixture was stirred by a ball mill at 60 rpm for 180 minutes to produce a slurry composition.

Examples 2 TO 27

Slurry compositions were prepared in the same manner as in Example 1, except that the polyvinyl acetal resins (a1), the polyvinyl acetal resins (a2), the polyvinyl acetal resins (B), and organic solvents shown in Table 4 were used.

Examples 28 TO 30

Preparation of Inorganic Dispersion

Slurry compositions were prepared in the same manner as in Example 1, except for the following respects. An amount of 0.5 parts by weight of the polyvinyl acetal resin (a1) shown in Table 4 was added to a mixed solvent comprising 25 parts by weight of toluene and 25 parts by weight of ethanol and stirred to be dissolved therein. Subsequently, 100 parts by weight of barium titanate powder (product of SAKAI CHEMICAL INDUSTRY CO., LTD., BT01) was added to the obtained solution. Then, 80 mL of a 2-mm diameter ceramic ball was added. The mixture was stirred by a ball mill (product of SEIWA LIKEN CO., Ltd., BM-10) at 60 rpm for 180 minutes.

After that, 0.5 parts by weight of the polyvinyl acetal resin (a2) shown in Table 4 was further added. The mixture was stirred by a ball mill at 60 rpm for 120 minutes to produce an inorganic dispersion.

TABLE 4

| | Inorganic dispersion | | | | | | |
|---|---|---|---|---|---|---|---|
| | | Polyvinyl acetal resin (a1) | | Polyvinyl acetal resin (a2) | | | Organic solvent | |
| | Inorganic powder | Types | Amount (parts by weight) | Types | Amount (parts by weight) | Y − X | Ethanol: toluene | Amount (parts by weight) |
| Example 1 | Barium titanate | a1-1 | 0.5 | a2-1 | 0.5 | 18 | 5:5 | 50 |
| Example 2 | Barium titanate | a1-1 | 1 | a2-1 | 1 | 18 | 5:5 | 50 |
| Example 3 | Barium titanate | a1-1 | 5 | a2-1 | 5 | 18 | 5:5 | 50 |
| Example 4 | Barium titanate | a1-1 | 0.2 | a2-1 | 0.2 | 18 | 5:5 | 50 |
| Example 5 | Barium titanate | a1-1 | 7 | a2-1 | 7 | 18 | 5:5 | 50 |
| Example 6 | Barium titanate | a1-1 | 0.7 | a2-1 | 0.3 | 18 | 5:5 | 50 |
| Example 7 | Barium titanate | a1-1 | 0.3 | a2-1 | 0.7 | 18 | 5:5 | 50 |
| Example 8 | Barium titanate | a1-2 | 0.5 | a2-2 | 0.5 | 8 | 5:5 | 50 |
| Example 9 | Barium titanate | a1-4 | 0.5 | a2-4 | 0.5 | 20 | 5:5 | 50 |
| Example 10 | Barium titanate | a1-1 | 0.5 | a2-6 | 0.5 | 15 | 5:5 | 50 |
| Example 11 | Barium titanate | a1-2 | 0.5 | a2-7 | 0.5 | 27 | 5:5 | 50 |
| Example 12 | Barium titanate | a1-2 | 0.5 | a2-8 | 0.5 | 27 | 5:5 | 50 |
| Example 13 | Barium titanate | a1-4 | 0.5 | a2-9 | 0.5 | 11 | 5:5 | 50 |
| Example 14 | Barium titanate | a1-4 | 0.5 | a2-10 | 0.5 | 11 | 5:5 | 50 |
| Example 15 | Barium titanate | a1-2 | 0.5 | a2-1 | 0.5 | 27 | 5:5 | 50 |
| Example 16 | Barium titanate | a1-4 | 0.5 | a2-1 | 0.5 | 11 | 5:5 | 50 |
| Example 17 | Barium titanate | a1-6 | 0.5 | a2-1 | 0.5 | 18 | 5:5 | 50 |
| Example 18 | Barium titanate | a1-7 | 0.5 | a2-1 | 0.5 | 18 | 5:5 | 50 |
| Example 19 | Barium titanate | a1-8 | 0.5 | a2-1 | 0.5 | 18 | 5:5 | 50 |
| Example 20 | Barium titanate | a1-9 | 0.5 | a2-1 | 0.5 | 18 | 5:5 | 50 |
| Example 21 | Barium titanate | a1-1 | 0.5 | a2-1 | 0.5 | 18 | 5:5 | 50 |
| Example 22 | Barium titanate | a1-1 | 0.5 | a2-1 | 0.5 | 18 | 5:5 | 50 |
| Example 23 | Barium titanate | a1-1 | 0.5 | a2-1 | 0.5 | 18 | 5:5 | 50 |
| Example 24 | Barium titanate | a1-1 | 0.5 | a2-1 | 0.5 | 18 | 5:5 | 50 |
| Example 25 | Barium titanate | a1-1 | 0.5 | a2-1 | 0.5 | 18 | 5:5 | 50 |
| Example 26 | Barium titanate | a1-1 | 0.5 | a2-1 | 0.5 | 18 | 5:5 | 50 |
| Example 27 | Barium titanate | a1-1 | 0.5 | a2-1 | 0.5 | 18 | 5:5 | 50 |
| Example 28 | Barium titanate | a1-1 | 0.5 | a2-1 | 0.5 | 18 | 5:5 | 50 |
| Example 29 | Barium titanate | a1-2 | 0.5 | a2-1 | 0.5 | 27 | 5:5 | 50 |
| Example 30 | Barium titanate | a1-4 | 0.5 | a2-1 | 0.5 | 11 | 5:5 | 50 |

| | Resin solution | | | | | |
|---|---|---|---|---|---|---|
| | Polyvinyl acetal resin (B) | | Organic solvent | | Amount of plasticizer | |
| | Types | Amount (parts by weight) | Ethanol: totoluene | Amount (parts by weight) | (DOP) (parts by weight) | Methods for adding polyvinyl acetal resin |
| Example 1 | B1 | 8 | 5:5 | 90 | 2 | Add resins (A) and (B) separately |
| Example 2 | B1 | 8 | 5:5 | 90 | 2 | |
| Example 3 | B1 | 8 | 5:5 | 90 | 2 | |
| Example 4 | B1 | 8 | 5:5 | 90 | 2 | |
| Example 5 | B1 | 8 | 5:5 | 90 | 2 | |
| Example 6 | B1 | 8 | 5:5 | 90 | 2 | |
| Example 7 | B1 | 8 | 5:5 | 90 | 2 | |
| Example 8 | B1 | 8 | 5:5 | 90 | 2 | |
| Example 9 | B1 | 8 | 5:5 | 90 | 2 | |
| Example 10 | B1 | 8 | 5:5 | 90 | 2 | |
| Example 11 | B1 | 8 | 5:5 | 90 | 2 | |
| Example 12 | B1 | 8 | 5:5 | 90 | 2 | |
| Example 13 | B1 | 8 | 5:5 | 90 | 2 | |
| Example 14 | B1 | 8 | 5:5 | 90 | 2 | |
| Example 15 | B1 | 8 | 5:5 | 90 | 2 | |
| Example 16 | B1 | 8 | 5:5 | 90 | 2 | |
| Example 17 | B1 | 8 | 5:5 | 90 | 2 | |
| Example 18 | B1 | 8 | 5:5 | 90 | 2 | |
| Example 19 | B1 | 8 | 5:5 | 90 | 2 | |
| Example 20 | B1 | 8 | 5:5 | 90 | 2 | |
| Example 21 | B2 | 8 | 5:5 | 90 | 2 | |
| Example 22 | B3 | 8 | 5:5 | 90 | 2 | |
| Example 23 | B4 | 8 | 5:5 | 90 | 2 | |
| Example 24 | B7 | 8 | 5:5 | 90 | 2 | |
| Example 25 | B8 | 8 | 5:5 | 90 | 2 | |

TABLE 4-continued

| | | | | | | |
|---|---|---|---|---|---|---|
| Example 26 | B9 | 8 | 5:5 | 90 | 2 | |
| Example 27 | B11 | 8 | 5:5 | 90 | 2 | |
| Example 28 | B1 | 8 | 5:5 | 90 | 2 | Add resins (a1), |
| Example 29 | B1 | 8 | 5:5 | 90 | 2 | (a2), and (B) |
| Example 30 | B1 | 8 | 5:5 | 90 | 2 | separately |

Comparative Examples 1

A slurry composition was prepared in the same manner as in Example 1, except that the polyvinyl acetal resins (a1) and the polyvinyl acetal resin (a2) were not added to the inorganic dispersion, and the polyvinyl acetal resins (B) and an organic solvent shown in Table 5 were used.

Comparative Example 2 to 4

Slurry compositions were prepared in the same manner as in Example 1, except that the polyvinyl acetal resin (a1) and the polyvinyl acetal resins (a2) were not added to the inorganic dispersion but dissolved in the resin solution along with the polyvinyl acetal resin (B) as shown in Table 5.

Comparative Examples 5 to 7

Slurry compositions were prepared in the same manner as in Example 1, except that the polyvinyl acetal resins (B) were not dissolved in the organic solvent, but added to the inorganic dispersion.

Comparative Examples 8 to 21

Slurry compositions were prepared in the same manner as in Example 1, except that the polyvinyl acetal resins (a1), the polyvinyl acetal resins (a2), the polyvinyl acetal resins (B), and organic solvents shown in Table 4 were used.

Comparative Example 22

A slurry composition was prepared in the same manner as in Example 1, except that "Hypermer KD-2" (product of Croda Inc., polyamine compound with a hydrocarbon grafted on a side chain) was used instead of the polyvinyl acetal resin (a1) and the polyvinyl acetal resin (a2).

TABLE 5

| | Inorganic dispersion | | | | | | | |
|---|---|---|---|---|---|---|---|---|
| | | Polyvinyl acetal resin (a1) | | Polyvinyl acetal resin (a2) | | | Organic solvent | |
| | Inorganic powder | Types | Amount (parts by weight) | Types | Amount (parts by weight) | Y − X | Ethanol: toluene | Amount (parts by weight) |
| Comparative Example 1 | Barium titanate | not added | | not added | | — | 5:5 | 50 |
| Comparative Example 2 | Barium titanate | not added | | not added | | — | 5:5 | 50 |
| Comparative Example 3 | Barium titanate | not added | | not added | | — | 5:5 | 50 |
| Comparative Example 4 | Barium titanate | not added | | not added | | — | 5:5 | 50 |
| Comparative Example 5 | Barium titanate | a1-1 | 0.5 | a2-1 | 0.5 | 18 | 5:5 | 50 |
| Comparative Example 6 | Barium titanate | a1-2 | 0.5 | a2-2 | 0.5 | 8 | 5:5 | 50 |
| Comparative Example 7 | Barium titanate | a1-2 | 0.5 | a2-1 | 0.5 | 27 | 5:5 | 50 |
| Comparative Example 8 | Barium titanate | not added | | a2-1 | 8 | — | 5:5 | 50 |
| Comparative Example 9 | Barium titanate | not added | | a2-1 | 8 | — | 5:5 | 50 |
| Comparative Example 10 | Barium titanate | a1-1 | 8 | not added | | — | 5:5 | 50 |
| Comparative Example 11 | Barium titanate | a1-1 | 8 | not added | | — | 5:5 | 50 |
| Comparative Example 12 | Barium titanate | a1-1 | 0.5 | a2-1 | 23 | 18 | 5:5 | 50 |
| Comparative Example 13 | Barium titanate | a1-1 | 23 | a2-1 | 0.5 | 18 | 5:5 | 50 |
| Comparative Example 14 | Barium titanate | a1-3 | 0.5 | a2-1 | 0.5 | 29 | 5:5 | 50 |
| Comparative Example 15 | Barium titanate | a1-5 | 0.5 | a2-1 | 0.5 | 7 | 5:5 | 50 |
| Comparative Example 16 | Barium titanate | a1-1 | 0.5 | a2-3 | 0.5 | 3 | 5:5 | 50 |
| Comparative Example 17 | Barium titanate | a1-1 | 0.5 | a2-5 | 0.5 | 31 | 5:5 | 50 |
| Comparative Example 18 | Barium titanate | a1-1 | 0.5 | a2-1 | 0.5 | 18 | 5:5 | 50 |
| Comparative Example 19 | Barium titanate | a1-1 | 0.5 | a2-1 | 0.5 | 18 | 5:5 | 50 |
| Comparative Example 20 | Barium titanate | a1-1 | 0.5 | a2-1 | 0.5 | 18 | 5:5 | 50 |
| Comparative Example 21 | Barium titanate | a1-1 | 0.5 | a2-1 | 0.5 | 18 | 5:5 | 50 |
| Comparative Example 22 | Barium titanate | KD-2 | 1 | not added | | — | 5:5 | 50 |

| | Resin solution | | | | | |
|---|---|---|---|---|---|---|
| | Polyvinyl acetal resin (B) | | Organic solvent | | Amount of plasticizer | |
| | Types | Amount (parts by weight) | Ethanol: toluene | Amount (parts by weight) | (DOP) (parts by weight) | Methods for adding polyvinyl acetal resin |
| Comparative Example 1 | B1 | 8 | 5:5 | 90 | 2 | — |
| Comparative Example 2 | a1-1 a2-1 B2 | 0.5 0.5 8 | 5:5 | 90 | 2 | Add resins (A) and (B) at the same time |

TABLE 5-continued

| | | | | | | |
|---|---|---|---|---|---|---|
| Comparative Example 3 | a1-2 | 0.5 | 5:5 | 90 | 2 | |
| | a2-1 | 0.5 | | | | |
| | B3 | 8 | | | | |
| Comparative Example 4 | a1-1 | 0.5 | 5:5 | 90 | 2 | |
| | a2-2 | 0.5 | | | | |
| | B4 | 8 | | | | |
| Comparative Example 5 | B1 | 8 | 5:5 | 90 | 2 | Add resin (B) |
| Comparative Example 6 | B1 | 8 | 5:5 | 90 | 2 | without dissolving |
| Comparative Example 7 | B1 | 8 | 5:5 | 90 | 2 | |
| Comparative Example 8 | B1 | 8 | 5:5 | 90 | 2 | Add resins (A) and |
| Comparative Example 9 | B1 | 8 | 5:5 | 90 | 2 | (B) separately |
| Comparative Example 10 | B1 | 8 | 5:5 | 90 | 2 | |
| Comparative Example 11 | B1 | 8 | 5:5 | 90 | 2 | |
| Comparative Example 12 | B1 | 8 | 5:5 | 90 | 2 | |
| Comparative Example 13 | B1 | 8 | 5:5 | 90 | 2 | |
| Comparative Example 14 | B1 | 8 | 5:5 | 90 | 2 | |
| Comparative Example 15 | B1 | 8 | 5:5 | 90 | 2 | |
| Comparative Example 16 | B1 | 8 | 5:5 | 90 | 2 | |
| Comparative Example 17 | B1 | 8 | 5:5 | 90 | 2 | |
| Comparative Example 18 | B5 | 8 | 5:5 | 90 | 2 | |
| Comparative Example 19 | B6 | 8 | 5:5 | 90 | 2 | |
| Comparative Example 20 | B10 | 8 | 5:5 | 90 | 2 | |
| Comparative Example 21 | B12 | 8 | 5:5 | 90 | 2 | |
| Comparative Example 22 | B1 | 8 | 5:5 | 90 | 2 | |

(Evaluation)

The obtained slurry compositions were evaluated with respect to the following items.

(1) Evaluation of Green sheet (Production of Green Sheet)

The obtained slurry compositions were applied on polyethylene terephthalate (PET) films subjected to releasing treatment in advance, in a manner that the thicknesses of the dried films become 20 μm, and dried. In this manner, ceramic green sheets were produced.

(1-1) Surface Roughness

The surface roughness Ra of the obtained ceramic green sheets was measured based on JIS B 0601 (1994). In this manner, the surface roughness of the ceramic slurries was evaluated. Also, the surface roughness Ra was measured after allowing the ceramic green sheets to stand for one week at 23° C.

Normally, the higher the dispersibility of a slurry composition is, the smaller the surface roughness of the ceramic green sheet is.

Excellent: smaller than 0.025 μm
Satisfactory: 0.025 μm or larger but smaller than 0.035 μm
Acceptable: 0.035 μm or larger but smaller than 0.045 μm
Poor: 0.045 μm or larger (One Week after)

Excellent: smaller than 0.030 μm
Satisfactory: 0.030 μm or larger but smaller than 0.040 μm
Acceptable: 0.040 μm or larger but smaller than 0.050 μm
Poor: 0.050 μm or larger (1-2) Tensile Modulus of Elasticity Measurement of the tensile modulus of elasticity (MPa) was carried out using AUTOGRAPH (product of Shimadzu Corporation, "AGS-J") at a pulling speed of 20 mm/min., according to JIS K 7113. Also, the tensile modulus of elasticity (MPa) was measured after allowing the green sheets to stand for one week at 23° C.

Excellent: 1600 MPa or larger
Satisfactory: 1400 MPa or larger but smaller than 1600 MPa
Acceptable: 1200 MPa or larger but smaller than 1400 MPa
Poor: smaller than 1200 MPa (One Week after)

Excellent: 1500 MPa or larger
Satisfactory: 1300 MPa or larger but smaller than 1500 MPa
Acceptable: 1100 MPa or larger but smaller than 1300 MPa
Poor: smaller than 1100 MPa (2) Evaluation on Dispersibility (Preparation of Solution for Evaluating Dispersibility)

An amount of 0.1 parts by weight of each obtained slurry composition was added to a mixed solvent comprising 5 parts by weight of ethanol and 5 parts by weight of toluene. The mixture was stirred by an ultrasonic disperser (product of SND Co., Ltd., US-303) for 10 minutes to produce a solution for evaluating dispersibility.

(Evaluation on Dispersibility)

Measurement of particle size distribution was carried out using a laser diffraction particle size analyzer (product of HORIBA Ltd., LA-910), with respect to the obtained solutions for evaluating dispersibility. The peak position of the maximum particle size and the average particle size were obtained. Also, the peak position of the maximum particle size and the average particle size were measured after allowing the solutions for evaluating dispersibility to stand for one week at 23° C.

Excellent: smaller than 0.4 μm
Satisfactory: 0.4 μm or larger but smaller than 0.5 μm
Acceptable: 0.5 μm or larger but smaller than 0.6 μm
Poor: 0.6 μm or larger (One Week after)

Excellent: smaller than 0.5 μm
Satisfactory: 0.5 μm or larger but smaller than 0.6 μm
Acceptable: 0.6 μm or larger but smaller than 0.7 μm
Poor: 0.7 μm or larger

TABLE 6

| | Evaluation of green sheet | | | | | | | |
|---|---|---|---|---|---|---|---|---|
| | Surface roughness Ra (μm) | Evaluation | Surface roughness Ra (μm) (one week after) | Evaluation | Tensile modulus of elasticity (MPa) | Evaluation | Tensile modulus of elasticity (MPa) (one week after) | Evaluation |
| Example 1 | 0.020 | Excellent | 0.023 | Excellent | 1800 | Excellent | 1650 | Excellent |
| Example 2 | 0.023 | Excellent | 0.026 | Excellent | 1770 | Excellent | 1620 | Excellent |
| Example 3 | 0.028 | Satisfactory | 0.032 | Satisfactory | 1650 | Excellent | 1510 | Excellent |
| Example 4 | 0.028 | Satisfactory | 0.032 | Satisfactory | 1670 | Excellent | 1530 | Excellent |
| Example 5 | 0.024 | Excellent | 0.027 | Excellent | 1710 | Excellent | 1570 | Excellent |
| Example 6 | 0.023 | Excellent | 0.026 | Excellent | 1750 | Excellent | 1610 | Excellent |
| Example 7 | 0.022 | Excellent | 0.025 | Excellent | 1720 | Excellent | 1580 | Excellent |
| Example 8 | 0.029 | Satisfactory | 0.033 | Satisfactory | 1660 | Excellent | 1520 | Excellent |
| Example 9 | 0.030 | Satisfactory | 0.034 | Satisfactory | 1610 | Excellent | 1480 | Satisfactory |
| Example 10 | 0.023 | Excellent | 0.026 | Excellent | 1750 | Excellent | 1610 | Excellent |
| Example 11 | 0.039 | Acceptable | 0.044 | Acceptable | 1390 | Acceptable | 1300 | Satisfactory |
| Example 12 | 0.027 | Satisfactory | 0.031 | Satisfactory | 1550 | Satisfactory | 1420 | Satisfactory |
| Example 13 | 0.029 | Satisfactory | 0.033 | Satisfactory | 1510 | Satisfactory | 1380 | Satisfactory |
| Example 14 | 0.038 | Acceptable | 0.043 | Acceptable | 1390 | Acceptable | 1300 | Satisfactory |
| Example 15 | 0.032 | Satisfactory | 0.036 | Satisfactory | 1550 | Satisfactory | 1420 | Satisfactory |
| Example 16 | 0.031 | Satisfactory | 0.035 | Satisfactory | 1510 | Satisfactory | 1380 | Satisfactory |
| Example 17 | 0.042 | Acceptable | 0.048 | Acceptable | 1390 | Acceptable | 1300 | Satisfactory |
| Example 18 | 0.030 | Satisfactory | 0.034 | Satisfactory | 1620 | Excellent | 1490 | Satisfactory |
| Example 19 | 0.033 | Satisfactory | 0.037 | Satisfactory | 1590 | Satisfactory | 1460 | Satisfactory |
| Example 20 | 0.043 | Acceptable | 0.049 | Acceptable | 1380 | Acceptable | 1340 | Satisfactory |
| Example 21 | 0.031 | Satisfactory | 0.035 | Satisfactory | 1600 | Excellent | 1470 | Satisfactory |
| Example 22 | 0.023 | Excellent | 0.026 | Excellent | 1890 | Excellent | 1730 | Excellent |
| Example 23 | 0.024 | Excellent | 0.027 | Excellent | 1820 | Excellent | 1670 | Excellent |
| Example 24 | 0.041 | Acceptable | 0.047 | Acceptable | 1350 | Acceptable | 1310 | Satisfactory |
| Example 25 | 0.029 | Satisfactory | 0.033 | Satisfactory | 1610 | Excellent | 1480 | Satisfactory |
| Example 26 | 0.039 | Acceptable | 0.044 | Acceptable | 1350 | Acceptable | 1300 | Satisfactory |
| Example 27 | 0.028 | Satisfactory | 0.032 | Satisfactory | 1650 | Excellent | 1510 | Excellent |
| Example 28 | 0.022 | Excellent | 0.024 | Excellent | 1840 | Excellent | 1640 | Excellent |
| Example 29 | 0.029 | Satisfactory | 0.032 | Satisfactory | 1550 | Satisfactory | 1440 | Satisfactory |
| Example 30 | 0.028 | Satisfactory | 0.033 | Satisfactory | 1540 | Satisfactory | 1410 | Satisfactory |

| | Evaluation on dispersibility | | | | | |
|---|---|---|---|---|---|---|
| | Peak position of the maximum particle size (μm) | Average size (μm) | Evaluation | Peak position of the maximum particle size (μm) (one week after) | Average size (μm) (one week after) | Evaluation |
| Example 1 | 0.38 | 0.32 | Excellent | 0.43 | 0.36 | Excellent |
| Example 2 | 0.42 | 0.34 | Excellent | 0.48 | 0.39 | Excellent |
| Example 3 | 0.54 | 0.46 | Satisfactory | 0.62 | 0.52 | Satisfactory |
| Example 4 | 0.53 | 0.47 | Satisfactory | 0.60 | 0.54 | Satisfactory |
| Example 5 | 0.45 | 0.34 | Excellent | 0.51 | 0.39 | Excellent |
| Example 6 | 0.44 | 0.37 | Excellent | 0.50 | 0.42 | Excellent |
| Example 7 | 0.47 | 0.38 | Excellent | 0.54 | 0.43 | Excellent |
| Example 8 | 0.52 | 0.43 | Satisfactory | 0.59 | 0.49 | Excellent |
| Example 9 | 0.54 | 0.42 | Satisfactory | 0.62 | 0.48 | Excellent |
| Example 10 | 0.44 | 0.35 | Excellent | 0.50 | 0.40 | Excellent |
| Example 11 | 0.57 | 0.54 | Acceptable | 0.62 | 0.59 | Satisfactory |
| Example 12 | 0.57 | 0.43 | Satisfactory | 0.65 | 0.49 | Satisfactory |
| Example 13 | 0.53 | 0.46 | Satisfactory | 0.60 | 0.52 | Satisfactory |
| Example 14 | 0.58 | 0.56 | Acceptable | 0.78 | 0.59 | Satisfactory |
| Example 15 | 0.56 | 0.42 | Satisfactory | 0.64 | 0.48 | Excellent |
| Example 16 | 0.51 | 0.45 | Satisfactory | 0.58 | 0.51 | Satisfactory |
| Example 17 | 0.64 | 0.58 | Acceptable | 0.73 | 0.59 | Satisfactory |
| Example 18 | 0.51 | 0.46 | Satisfactory | 0.58 | 0.52 | Satisfactory |
| Example 19 | 0.55 | 0.42 | Satisfactory | 0.63 | 0.48 | Excellent |
| Example 20 | 0.62 | 0.58 | Acceptable | 0.71 | 0.59 | Satisfactory |
| Example 21 | 0.54 | 0.42 | Satisfactory | 0.62 | 0.48 | Excellent |
| Example 22 | 0.44 | 0.38 | Excellent | 0.50 | 0.43 | Excellent |
| Example 23 | 0.46 | 0.36 | Excellent | 0.52 | 0.41 | Excellent |
| Example 24 | 0.65 | 0.52 | Acceptable | 0.74 | 0.59 | Satisfactory |
| Example 25 | 0.52 | 0.48 | Satisfactory | 0.59 | 0.55 | Satisfactory |
| Example 26 | 0.64 | 0.55 | Acceptable | 0.73 | 0.59 | Satisfactory |
| Example 27 | 0.54 | 0.41 | Satisfactory | 0.62 | 0.47 | Excellent |
| Example 28 | 0.37 | 0.32 | Excellent | 0.42 | 0.35 | Excellent |
| Example 29 | 0.47 | 0.41 | Satisfactory | 0.52 | 0.49 | Excellent |
| Example 30 | 0.46 | 0.43 | Satisfactory | 0.53 | 0.51 | Satisfactory |

TABLE 7

| | Evaluation of green sheet | | | | | | | |
|---|---|---|---|---|---|---|---|---|
| | Surface roughness Ra (μm) | Evaluation | Surface roughness Ra (μm) (one week after) | Evaluation | Tensile modulus of elasticity (MPa) | Evaluation | Tensile modulus of elasticity (MPa) (one week after) | Evaluation |
| Comparative Example 1 | 0.160 | Poor | 0.281 | Poor | 820 | Poor | 620 | Poor |
| Comparative Example 2 | 0.137 | Poor | 0.239 | Poor | 930 | Poor | 700 | Poor |
| Comparative Example 3 | 0.097 | Poor | 0.169 | Poor | 860 | Poor | 850 | Poor |
| Comparative Example 4 | 0.107 | Poor | 0.187 | Poor | 940 | Poor | 710 | Poor |
| Comparative Example 5 | 0.113 | Poor | 0.201 | Poor | 910 | Poor | 720 | Poor |
| Comparative Example 6 | 0.092 | Poor | 0.178 | Poor | 840 | Poor | 680 | Poor |
| Comparative Example 7 | 0.123 | Poor | 0.192 | Poor | 900 | Poor | 740 | Poor |
| Comparative Example 8 | 0.051 | Poor | 0.089 | Poor | 1180 | Poor | 890 | Poor |
| Comparative Example 9 | 0.057 | Poor | 0.099 | Poor | 1200 | Acceptable | 910 | Poor |
| Comparative Example 10 | 0.055 | Poor | 0.096 | Poor | 1080 | Poor | 820 | Poor |
| Comparative Example 11 | 0.067 | Poor | 0.117 | Poor | 1040 | Poor | 790 | Poor |
| Comparative Example 12 | 0.058 | Poor | 0.101 | Poor | 940 | Poor | 710 | Poor |
| Comparative Example 13 | 0.052 | Poor | 0.091 | Poor | 980 | Poor | 740 | Poor |
| Comparative Example 14 | 0.048 | Poor | 0.084 | Poor | 1320 | Acceptable | 1000 | Poor |
| Comparative Example 15 | 0.043 | Acceptable | 0.075 | Poor | 1250 | Acceptable | 950 | Poor |
| Comparative Example 16 | 0.044 | Acceptable | 0.077 | Poor | 1060 | Poor | 800 | Poor |
| Comparative Example 17 | 0.048 | Poor | 0.085 | Poor | 1260 | Acceptable | 950 | Poor |
| Comparative Example 18 | 0.043 | Acceptable | 0.075 | Poor | 1170 | Poor | 880 | Poor |
| Comparative Example 19 | 0.053 | Poor | 0.092 | Poor | 1130 | Poor | 850 | Poor |
| Comparative Example 20 | 0.044 | Acceptable | 0.077 | Poor | 1170 | Poor | 880 | Poor |
| Comparative Example 21 | 0.053 | Poor | 0.092 | Poor | 1130 | Poor | 850 | Poor |
| Comparative Example 22 | 0.149 | Poor | 0.260 | Poor | 770 | Poor | 580 | Poor |

| | Evaluation on dispersibility | | | | | |
|---|---|---|---|---|---|---|
| | Peak position of the maximum particle size (μm) | Average size (μm) | Evaluation | Peak position of the maximum particle size (μm) | Average size (μm) (one week after) | Evaluation |
| Comparative Example 1 | 2.58 | 2.35 | Poor | 3.11 | 2.70 | Poor |
| Comparative Example 2 | 2.61 | 2.48 | Poor | 3.89 | 2.97 | Poor |
| Comparative Example 3 | 1.56 | 1.42 | Poor | 2.48 | 1.91 | Poor |
| Comparative Example 4 | 1.73 | 1.57 | Poor | 2.74 | 2.71 | Poor |
| Comparative Example 5 | 1.72 | 1.65 | Poor | 2.82 | 2.56 | Poor |
| Comparative Example 6 | 1.46 | 1.40 | Poor | 2.25 | 1.99 | Poor |
| Comparative Example 7 | 1.53 | 1.46 | Poor | 2.04 | 1.94 | Poor |
| Comparative Example 8 | 0.82 | 0.75 | Poor | 1.31 | 1.28 | Poor |
| Comparative Example 9 | 0.92 | 0.84 | Poor | 1.47 | 1.44 | Poor |
| Comparative Example 10 | 0.88 | 0.80 | Poor | 1.43 | 1.38 | Poor |
| Comparative Example 11 | 1.08 | 0.99 | Poor | 1.73 | 1.70 | Poor |
| Comparative Example 12 | 0.61 | 0.57 | Acceptable | 0.99 | 0.95 | Poor |
| Comparative Example 13 | 0.84 | 0.77 | Poor | 1.34 | 1.32 | Poor |
| Comparative Example 14 | 0.76 | 0.70 | Poor | 1.25 | 1.19 | Poor |
| Comparative Example 15 | 0.75 | 0.68 | Poor | 1.19 | 1.17 | Poor |
| Comparative Example 16 | 0.71 | 0.65 | Poor | 1.13 | 1.11 | Poor |
| Comparative Example 17 | 0.74 | 0.72 | Poor | 1.26 | 1.16 | Poor |
| Comparative Example 18 | 0.75 | 0.68 | Poor | 1.19 | 1.17 | Poor |
| Comparative Example 19 | 0.86 | 0.78 | Poor | 1.36 | 1.35 | Poor |
| Comparative Example 20 | 0.75 | 0.68 | Poor | 1.19 | 1.17 | Poor |
| Comparative Example 21 | 0.86 | 0.78 | Poor | 1.38 | 1.35 | Poor |
| Comparative Example 22 | 2.39 | 2.18 | Poor | 3.81 | 3.76 | Poor |

Examples 31 AND 32

Slurry compositions were prepared in the same manner as in Example 1, except that aluminum nitride powder, instead of the barium titanate, was used as an inorganic powder, and the polyvinyl acetal resins (a1), the polyvinyl acetal resins (a2), the polyvinyl acetal resins (B), and an organic solvent shown in Table 8 were used.

Examples 33 AND 34

Slurry compositions were prepared in the same manner as in Example 1, except that Ni—Zn ferrite powder, instead of barium titanate, was used as an inorganic powder, and the polyvinyl acetal resins (a1), the polyvinyl acetal resins (a2), the polyvinyl acetal resins (B), and an organic solvent shown in Table 8 were used.

Comparative Example 23

A slurry composition was prepared in the same manner as in Example 1, except that aluminum nitride powder, instead of the barium titanate, was used as an inorganic powder, the polyvinyl acetal resin (a1) and the polyvinyl acetal resin (a2) were not added, and the polyvinyl acetal resin (B) and an organic solvent shown in Table 8 were used.

Comparative Example 24

A slurry composition was prepared in the same manner as in Example 1, except that Ni—Zn ferrite powder, instead of barium titanate, was used as an inorganic powder, the polyvinyl acetal resin (a1) and the polyvinyl acetal resin (a2) were not added, and the polyvinyl acetal resin (B) and an organic solvent shown in Table 8 were used.

TABLE 8

| | Inorganic dispersion | | | | | | | |
|---|---|---|---|---|---|---|---|---|
| | | Polyvinyl acetal resin (a1) | | Polyvinyl acetal resin (a2) | | | Organic solvent | |
| | Inorganic powder | Types | Amount (parts by weight) | Types | Amount (parts by weight) | [X − Y] | Ethanol: toluene | Amount (parts by weight) |
| Example 31 | Aluminum nitride | a1-1 | 0.5 | a2-1 | 0.5 | 18 | 5:5 | 50 |
| Example 32 | Aluminum nitride | a1-2 | 0.5 | a2-1 | 0.5 | 27 | 5:5 | 50 |
| Example 33 | Ni—Zn ferrite | a1-1 | 0.5 | a2-1 | 0.5 | 18 | 5:5 | 50 |
| Example 34 | Ni—Zn ferrite | a1-2 | 0.5 | a2-1 | 0.5 | 27 | 5:5 | 50 |
| Comparative Example 23 | Aluminum nitride | | not added | | not added | — | 5:5 | 50 |
| Comparative Example 24 | Ni—Zn ferrite | | not added | | not added | — | 5:5 | 50 |

| | Resin solution | | | | |
|---|---|---|---|---|---|
| | Polyvinyl acetal resin (B) | | Organic solvent | | Amount of plasticizer |
| | Types | Amount (parts by weight) | Ethanol: toluene | Amount (parts by weight) | (DOP) (parts by weight) |
| Example 31 | B1 | 8 | 5:5 | 90 | 2 |
| Example 32 | B1 | 8 | 5:5 | 90 | 2 |
| Example 33 | B1 | 8 | 5:5 | 90 | 2 |
| Example 34 | B1 | 8 | 5:5 | 90 | 2 |
| Comparative Example 23 | B1 | 8 | 5:5 | 90 | 2 |
| Comparative Example 24 | B1 | 8 | 5:5 | 90 | 2 |

(Evaluation)

The obtained slurry compositions were evaluated with respect to the following items.

(1) Evaluation of Green sheet (Production of Green Sheet)

The obtained slurry compositions were applied on polyethylene terephthalate (PET) films subjected to releasing treatment in advance, in a manner that the thicknesses of the dried films become 20 μm, and dried. In this manner, ceramic green sheets were produced.

(1-1) Surface Roughness

The surface roughness Ra of the obtained ceramic green sheets was measured based on JIS B 0601 (1994). In this manner, the surface roughness of the ceramic slurries was evaluated. Also, the surface roughness Ra was measured after allowing the green sheets to stand for one week at 23° C.

Normally, the higher the dispersibility of a slurry composition is, the smaller the surface roughness of the ceramic green sheet is.

Excellent: smaller than 0.2 μm
Satisfactory: 0.2 μm or larger but smaller than 0.3 μm
Acceptable: 0.3 μm or larger but smaller than 0.4 μm
Poor: 0.4 μm or larger
(One Week after)
Excellent: smaller than 0.25 μm
Satisfactory: 0.25 μm or larger but smaller than 0.35 μm
Acceptable: 0.35 μm or larger but smaller than 0.45 μm
Poor: 0.45 μm or larger (1-2) Tensile Modulus of Elasticity Measurement of the tensile modulus of elasticity (MPa) was carried out using AUTOGRAPH (product of Shimadzu Corporation, "AGS-J") at a pulling speed of 20 mm/min., according to JIS K 7113. Also, the tensile modulus of elasticity (MPa) was measured after allowing the green sheets to stand for one week at 23° C.

Excellent: 1500 MPa or larger
Satisfactory: 1200 MPa or larger but smaller than 1500 MPa
Acceptable: 900 MPa or larger but smaller than 1200 MPa
Poor: smaller than 900 MPa
(One Week after)
Excellent: 1450 MPa or larger
Satisfactory: 1150 MPa or larger but smaller than 1450 MPa
Acceptable: 850 MPa or larger but smaller than 1150 MPa
Poor: smaller than 850 MPa (2) Evaluation on Dispersibility (Preparation of Solution for Evaluating Dispersibility)

0.1 parts by weight of each obtained slurry composition was added to a mixed solvent comprising 5 parts by weight of ethanol and 5 parts by weight of toluene. The mixture was stirred by an ultrasonic disperser (product of SND Co., Ltd., US-303) for 10 minutes to produce a solution for evaluating dispersibility.

(Evaluation on Dispersibility)

Measurement of particle size distribution was carried out using a laser diffraction particle size analyzer (product of HORIBA Ltd., LA-910), with respect to the obtained solutions for evaluating dispersibility. The peak position of the maximum particle size and the average particle size were obtained. Also, the peak position of the maximum particle size and the average particle size were measured after allowing the solution for evaluating dispersibility to stand for one week at 23° C.

Excellent: smaller than 2 μm
Satisfactory: 2 μm or larger but smaller than 3 μm
Acceptable: 3 μm or larger but smaller than 4 μm
Poor: 4 μm or larger (One Week after)
Excellent: smaller than 2.5 μm
Satisfactory: 2.5 μm or larger but smaller than 3.5 μm
Acceptable: 3.5 μm or larger but smaller than 4.5 μm
Poor: 4.5 μm or larger

TABLE 9

| | Evaluation of green sheets | | | | | | | |
|---|---|---|---|---|---|---|---|---|
| | Surface roughness Ra (μm) | Evaluation | Surface roughness Ra (μm) (one week after) | Evaluation | Tensile modulus of elasticity (MPa) | Evaluation | Tensile modulus of elasticity (MPa) (one week after) | Evaluation |
| Example 31 | 0.181 | Excellent | 0.193 | Excellent | 1510 | Excellent | 1460 | Excellent |
| Example 32 | 0.192 | Excellent | 0.202 | Excellent | 1560 | Excellent | 1530 | Excellent |
| Example 33 | 0.201 | Satisfactory | 0.219 | Excellent | 1620 | Excellent | 1570 | Excellent |
| Example 34 | 0.211 | Satisfactory | 0.224 | Excellent | 1590 | Excellent | 1500 | Excellent |
| Comparative Example 23 | 0.56 | Poor | 0.88 | Poor | 890 | Poor | 790 | Poor |
| Comparative Example 24 | 0.69 | Poor | 0.89 | Poor | 820 | Poor | 730 | Poor |

| | Evaluation on dispersibility | | | | | |
|---|---|---|---|---|---|---|
| | Peak position of the maximum particle size (μm) | Average size (μm) | Evaluation | Peak position of the maximum particle size (μm) (one week after) | Average size (μm) (one week after) | Evaluation |
| Example 31 | 2.02 | 1.98 | Excellent | 2.34 | 2.29 | Excellent |
| Example 32 | 1.95 | 2.02 | Satisfactory | 2.21 | 2.23 | Excellent |
| Example 33 | 2.05 | 1.95 | Excellent | 2.43 | 2.49 | Excellent |
| Example 34 | 2.43 | 2.49 | Satisfactory | 2.46 | 2.53 | Satisfactory |
| Comparative Example 23 | 10.1 | 12.1 | Poor | 15.4 | 15.9 | Poor |
| Comparative Example 24 | 12.1 | 13.4 | Poor | 16.5 | 17.0 | Poor |

INDUSTRIAL APPLICABILITY

The present invention provides a method for simply producing a slurry composition which realizes excellent dispersibility and can maintain high dispersibility over a long term. The present invention also provides a slurry composition produced using this method.

The invention claimed is:

1. A method for producing a slurry composition that contains an inorganic powder, a polyvinyl acetal resin, and an organic solvent, the method comprising the steps of:
   mixing an inorganic powder, a mixed polyvinyl acetal resin (A) and one or more organic solvents to prepare an inorganic dispersion;
   mixing a polyvinyl acetal resin (B) and one or more organic solvents to prepare a resin solution; and
   adding the resin solution to the inorganic dispersion,
   the mixed polyvinyl acetal resin (A) including a polyvinyl acetal resin (a1) having a hydroxy group content of 20 to 40 mol % and a polyvinyl acetal resin (a2) having a polymerization degree of 200 to 600 and a hydroxy group content of 28 to 60 mol %,
   the polyvinyl acetal resin (a1) and the polyvinyl acetal resin (a2) being in a relation represented by the following formula (1):

$$Y - X \geq 5 \quad (1)$$

wherein X represents the hydroxy group content (mol %) in the polyvinyl acetal resin (a1), and Y represents the hydroxy group content (mol %) in the polyvinyl acetal resin (a2),
   the polyvinyl acetal resin (B) having a polymerization degree of 800 to 4200, and
   the amount of the mixed polyvinyl acetal resin (A) used in the step of preparation of the inorganic dispersion being 0.1 to 20 parts by weight relative to 100 parts by weight of the inorganic powder.

2. The method for producing a slurry composition according to claim 1,
   wherein the polyvinyl acetal resin (a1) has a polymerization degree of 20 to 450.

3. The method for producing a slurry composition according to claim 1,
   wherein the polyvinyl acetal resin (a2) comprises an anionic group.

4. The method for producing a slurry composition according to claim 1,
   wherein the polyvinyl acetal resin (B) has a hydroxy group content of 22 to 42 mol %.

5. The method for producing a slurry composition according to claim 1,
   wherein the one or more organic solvents are each mixed solvents comprising ethanol and toluene.

* * * * *